US009616703B2

(12) United States Patent
Nishida et al.

(10) Patent No.: US 9,616,703 B2
(45) Date of Patent: Apr. 11, 2017

(54) NON-PNEUMATIC TIRE

(71) Applicant: BRIDGESTONE CORPORATION, Chuo-ku, Tokyo (JP)

(72) Inventors: Masashi Nishida, Tokyo (JP); Akihiko Abe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/030,403

(22) PCT Filed: Sep. 11, 2014

(86) PCT No.: PCT/JP2014/074124
§ 371 (c)(1),
(2) Date: Apr. 19, 2016

(87) PCT Pub. No.: WO2015/060035
PCT Pub. Date: Apr. 30, 2015

(65) Prior Publication Data
US 2016/0243890 A1    Aug. 25, 2016

(30) Foreign Application Priority Data
Oct. 22, 2013    (JP) .................................. 2013-219494

(51) Int. Cl.
*B60B 1/14* (2006.01)
*B60B 9/04* (2006.01)
(Continued)

(52) U.S. Cl.
CPC .................. *B60B 1/14* (2013.01); *B60B 5/02* (2013.01); *B60B 9/04* (2013.01); *B60C 7/14* (2013.01);
(Continued)

(58) Field of Classification Search
CPC ....... B60B 1/14; B60B 9/04; B60B 2900/321; B60B 2360/32; B60B 2310/204;
(Continued)

(56) References Cited

U.S. PATENT DOCUMENTS 2,709,471 A    5/1955    Smith et al.
2,896,687 A    7/1959    Smith et al.
(Continued)

FOREIGN PATENT DOCUMENTS

CN    1369386 A    9/2002
CN    103241061 A    8/2013
(Continued)

Primary Examiner — S. Joseph Morano
Assistant Examiner — Jean Charleston
(74) Attorney, Agent, or Firm — Sughrue Mion, PLLC

(57) ABSTRACT

A non-pneumatic tire includes an attachment body (11) attached to an axle, an inner tubular body (12) fitted onto the attachment body (11) from the outside, an outer tubular body (13) configured to surround the inner tubular body (12) from the outside in a tire radial direction, and a plurality of connecting members (15) disposed between the inner tubular body (12) and the outer tubular body (13) in a tire circumferential direction and configured to connect both of the tubular bodies (12) and (13) while maintaining relative elastic displacement therebetween, wherein at least one of an outer circumferential section of the attachment body (11) and an inner circumferential section of the inner tubular body (12) that are locked to each other is inclined throughout the circumference in the tire circumferential direction from the outside toward the inside in a tire radial direction as it goes from both of the outsides toward the inside in a tire width direction (H), and is formed in a V shape when seen in a cross-sectional view in the tire width direction (H).

5 Claims, 11 Drawing Sheets

(51) Int. Cl.
    *B60C 7/24*     (2006.01)
    *B60B 5/02*     (2006.01)
    *B60C 7/14*     (2006.01)
    *B29D 30/02*     (2006.01)

(52) U.S. Cl.
    CPC ............... *B60C 7/24* (2013.01); *B29D 30/02* (2013.01); *B60B 2310/204* (2013.01); *B60B 2360/32* (2013.01); *B60B 2900/111* (2013.01); *B60B 2900/321* (2013.01); *B60C 2007/146* (2013.04)

(58) Field of Classification Search
    CPC ....... B60B 2900/111; B60C 7/14; B60C 7/24; B60C 2007/146; B29D 30/02
    USPC ................ 152/12, 69, 72, 75, 79, 80, 84, 86
    See application file for complete search history.

(56) References Cited

U.S. PATENT DOCUMENTS

| | | |
|---|---|---|
| 5,762,405 A | 6/1998 | Dempsey |
| 8,646,497 B2 * | 2/2014 | Cron .......................... B60C 7/12 152/12 |
| 8,813,797 B2 * | 8/2014 | Anderson ............... B60C 7/105 152/11 |
| 2002/0092589 A1 | 7/2002 | Katoh et al. |
| 2010/0218869 A1 * | 9/2010 | Abe ........................ B60B 9/26 152/246 |
| 2011/0248554 A1 * | 10/2011 | Chon ........................ B60B 9/02 301/63.102 |
| 2013/0126065 A1 * | 5/2013 | Maeyama ............... B60B 21/12 152/520 |

FOREIGN PATENT DOCUMENTS

| | | |
|---|---|---|
| DE | 2014264 A1 | 10/1971 |
| DE | 2944150 A1 | 5/1981 |
| EP | 0 159 888 A2 | 10/1985 |
| JP | 58-36702 A | 3/1983 |
| JP | 60-236803 A | 11/1985 |
| JP | 3-182809 A | 8/1991 |
| JP | 10236217 A | 9/1998 |
| JP | 2005247305 A | 9/2005 |
| JP | 2007331708 A | 12/2007 |
| JP | 2013-86712 A | 5/2013 |
| WO | 0076789 A1 | 12/2000 |

* cited by examiner

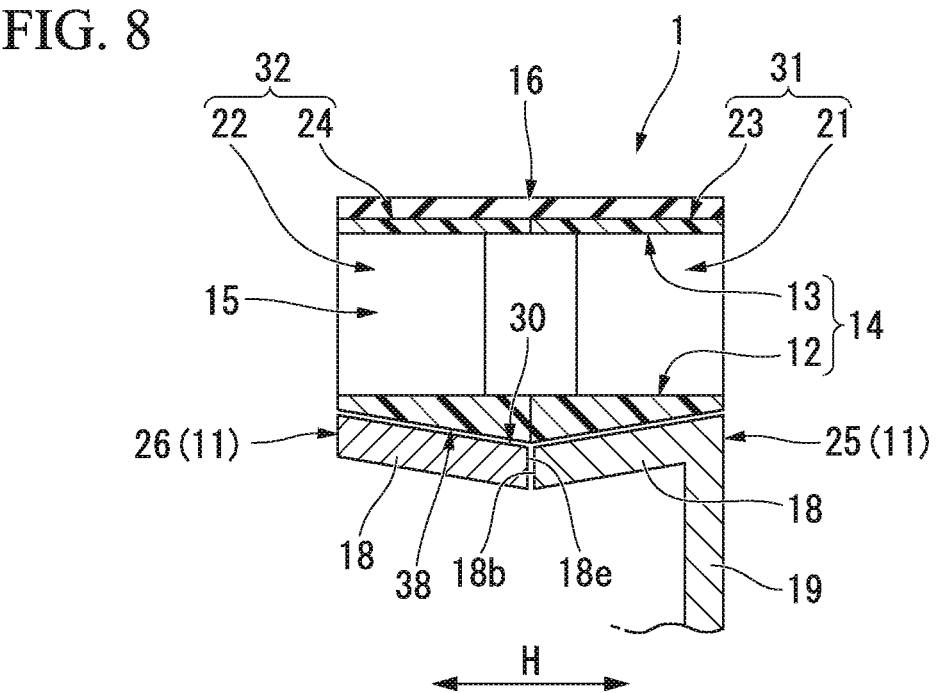
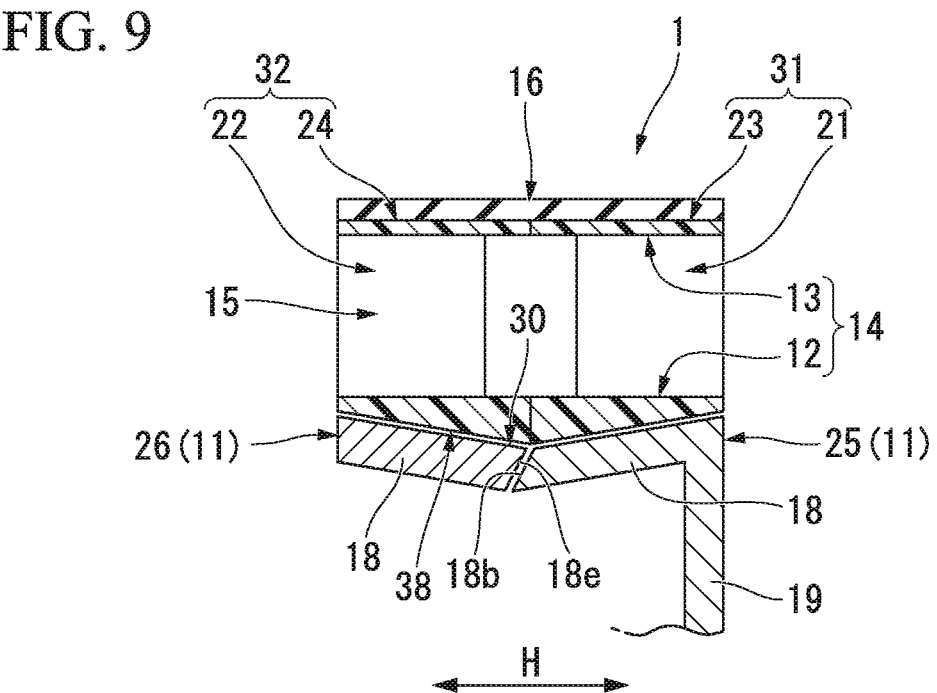

NON-PNEUMATIC TIRE

TECHNICAL FIELD

The present invention relates to a non-pneumatic tire that can be used without being filled with pressurized air.

This application is a National Stage of International Application No. PCT/JP2014/074124, filed on Sep. 11, 2014, which claims priority from Japanese Patent Application No. 2013-219494, filed Oct. 22, 2013, the contents of all of which are incorporated herein by reference.

BACKGROUND ART

In the related art, for example, a non-pneumatic tire disclosed in the following Patent Document 1 is known. The non-pneumatic tire includes an attachment body attached to an axle, an inner tubular body fitted onto the attachment body, an outer tubular body configured to surround the inner tubular body from the outside in a tire radial direction, and a plurality of connecting members disposed between the inner tubular body and the outer tubular body in a tire circumferential direction and configured to connect both of the tubular bodies while allowing elastic displacement therebetween.

In the non-pneumatic tire, an inner circumferential section of the inner tubular body and an outer circumferential section of the attachment body are relatively slidably fitted in an axial direction (a tire width direction) of the non-pneumatic tire.

DOCUMENT OF RELATED ART

Patent Document

[Patent Document 1]
Japanese Unexamined Patent Application, First Publication No. 2013-86712

SUMMARY OF INVENTION

Technical Problem

However, in the non-pneumatic tire of the related art, in a state in which the inner circumferential section of the inner tubular body and the outer circumferential section of the attachment body have certain diameters throughout the tire width direction and the inner tubular body and the attachment body are fitted to each other, prevention of positional deviation in the tire width direction by these bodies should be improved more.

In consideration of the above-mentioned circumstances, the present invention is directed to provide a non-pneumatic tire capable of preventing positional deviation of an inner tubular body and an attachment body in a tire width direction.

Solution to Problem

A non-pneumatic tire of the present invention includes an attachment body attached to an axle; an inner tubular body fitted onto the attachment body from the outside; an outer tubular body configured to surround the inner tubular body from the outside in a tire radial direction; and a plurality of connecting members disposed between the inner tubular body and the outer tubular body in a tire circumferential direction and configured to connect both of the tubular bodies while maintaining relative elastic displacement therebetween, wherein at least one of an outer circumferential section of the attachment body and an inner circumferential section of the inner tubular body that are locked to each other is inclined throughout the circumference in the tire circumferential direction from the outside toward the inside in the tire radial direction as it goes from both of the outsides toward the inside in a tire width direction, and formed in a V shape when seen in a cross-sectional view in the tire width direction.

According to the non-pneumatic tire of the present invention, as at least one of the inner circumferential section of the inner tubular body and the outer circumferential section of the attachment body is formed in a tapered shape inclined throughout the circumference in the tire circumferential direction from the outside toward the inside in the tire radial direction as it goes from both of the outsides toward the inside in the tire width direction and formed in the V shape when seen in the cross-sectional view in the tire width direction, and the inner circumferential section of the inner tubular body and the outer circumferential section of the attachment body are locked, a resistance force when there is relative movement between the inner tubular body and the attachment body in the tire width direction can be increased.

Accordingly, relative movement of the inner tubular body and the attachment body in the tire width direction is restricted, and positional deviation of the inner tubular body and the attachment body in the tire width direction can be reliably prevented. In addition, the fixing strength of the inner tubular body and the attachment body can be improved.

Further, when the outer circumferential section of the attachment body is formed in the V shape when seen in the cross-sectional view, the capacity of the attachment body can be reduced according to a depression amount of the outer circumferential section. For example, when the attachment body is formed of a metal material and the inner tubular body is formed of a synthetic resin material, the entire weight of the non-pneumatic tire can be reduced.

Further, the "V shape when seen in the cross-sectional view in the tire width direction" in the present invention includes, when seen in the cross-sectional view in the tire width direction, for example, a V shape formed by a plurality of straight lines, a V shape formed by curved lines, a V shape having a step difference, or the like, in addition to the V shape formed by two straight lines. Specifically, the "V shape" capable of restricting the relative movement thereof in the tire width direction when the inner tubular body is fitted onto the attachment body from the outside may be used.

In addition, in the non-pneumatic tire of the present invention, the attachment body may include a pair of split bodies that are split in the tire width direction.

In the present invention, as described above, since at least one of the inner circumferential section of the inner tubular body and the outer circumferential section of the attachment body is formed in the tapered shape, as the attachment body includes the pair of split bodies that are split in the tire width direction, the split bodies can be easily fitted into the inner tubular body while the split bodies approach each other in the tire width direction, and the assemblability of the inner tubular body and the attachment body is improved. That is, according to the above-mentioned configuration, since caulking and fitting by the taper are performed, the attachment body can be simply inserted into the inner tubular body without using a large-scaled facility, and the inner tubular body and the attachment body can be reliably fitted and fixed.

Specifically, in the related art, the inner circumferential section of the inner tubular body and the outer circumferential section of the attachment body have constant diameters throughout the region in the tire width direction, and it may be difficult to fit the inner tubular body and the attachment body. That is, the attachment body may not be inserted into the inner tubular body or the attachment body may rattle in the inner tubular body and be hard to fix. In order to reliably fit the attachment body and the inner tubular body, fitting dimensional accuracy therebetween should be increased, and manufacturing thereof is complicated.

Meanwhile, according to the above-mentioned configuration of the present invention, as the inner tubular body and the attachment body are caulked and fitted, since the inner tubular body and the attachment body are securely and easily fitted without rattling, high dimensional accuracy as is necessary in the related art is not needed, and manufacturing thereof becomes easy.

In addition, in the non-pneumatic tire of the present invention, an attachment concave section may be formed in one of split surfaces of the pair of split bodies, and an attachment convex section locked to the attachment concave section may be formed in the second split surface.

According to the above-mentioned configuration, in the case in which the attachment body is fitted into the inner tubular body, when the pair of split bodies approach each other in the tire width direction and cause the split surfaces to abut each other, as the attachment concave sections and the attachment convex sections of the split surfaces are locked, since relative movement of the split bodies in the tire circumferential direction or the tire radial direction is restricted, the non-pneumatic tire can be stably used.

In addition, in the non-pneumatic tire of the present invention, the outer circumferential surface of the attachment body may be the outer circumferential section throughout the region in the tire width direction, and may be inclined from the outside toward the inside in the tire radial direction as it goes from both of the outer ends in the tire width direction inward in the tire width direction.

In this case, since the outer circumferential surface of the attachment body is the outer circumferential section that forms a tapered shape throughout the region in the tire width direction, the above-mentioned effects can be more stably obtained. In addition, locking positions of the outer circumferential section of the attachment body and the inner circumferential section of the inner tubular body are disposed at, for example, both of the outer portions (both of the outer end portions) in the tire width direction, and in this case, mounting stability of the inner tubular body with respect to the attachment body is further improved.

In addition, in the non-pneumatic tire of the present invention, the pair of split bodies may be fixed to each other by a fastening member.

In this case, the assembled attachment body can be prevented from being disassembled while the attachment body is split in the tire width direction to obtain the above-mentioned effects, and the non-pneumatic tire can be stably used.

Effects of Invention

According to the non-pneumatic tire of the present invention, positional deviation of the inner tubular body and the attachment body in the tire width direction can be prevented.

BRIEF DESCRIPTION OF DRAWINGS

FIG. 8 is a partial cross-sectional view schematically showing a variant of the non-pneumatic tire of the present invention.

FIG. 9 is a partial cross-sectional view schematically showing the variant of the non-pneumatic tire of the present invention.

DESCRIPTION OF EMBODIMENTS

Hereinafter, a non-pneumatic tire 1 according to an embodiment of the present invention will be described with reference to the accompanying drawings.

Figure 1:
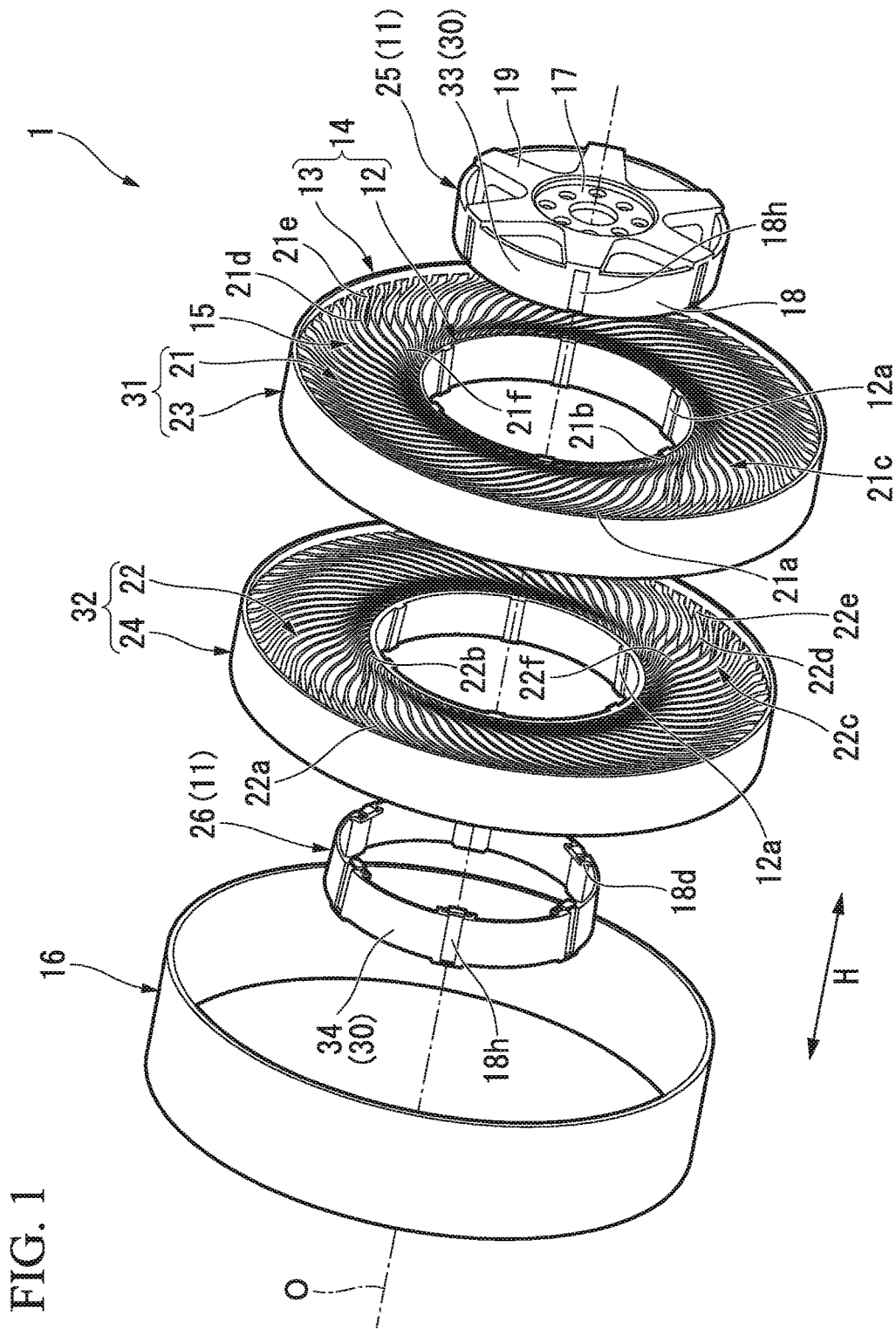
FIG. 1 is an exploded perspective view of a non-pneumatic tire of an embodiment according to the present invention.

In FIG. 1, the non-pneumatic tire 1 of the embodiment includes an attachment body 11 attached to an axle (not shown), a ring member 14 including an inner tubular body 12 fitted onto the attachment body 11 from the outside and an outer tubular body 13 configured to surround the inner tubular body 12 from the outside in a tire radial direction, a plurality of connecting members 15 disposed between the inner tubular body 12 and the outer tubular body 13 in a tire circumferential direction and connecting the tubular bodies 12 and 13 to each other while allowing relative elastic displacement therebetween, and a tread member 16 disposed at an outer circumferential surface side (the outside in the tire radial direction) of the outer tubular body 13 throughout the circumference.

Here, the attachment body 11, the inner tubular body 12, the outer tubular body 13 and the tread member 16 are disposed coaxially with a common axis. The common axis is referred to as an axis O, a direction along the axis O is referred to as a tire width direction H, a direction perpendicular to the axis O is referred to as a tire radial direction, and a direction around the axis O is referred to as a tire circumferential direction. Further, the attachment body 11, the inner tubular body 12, the outer tubular body 13 and the tread member 16 are disposed such that central portions thereof in the tire width direction H coincide with each other.

In the ring member 14, a size in the tire width direction H, i.e., the width, of the outer tubular body 13 is larger than that of the inner tubular body 12. In the embodiment, the inner tubular body 12 and the outer tubular body 13 have certain diameters throughout the tire width direction. In addition, a plurality of protrusion sections 12a protruding inward in the tire radial direction and extending throughout the length in the tire width direction H are formed at an inner circumferential surface of the inner tubular body 12 at intervals in the tire circumferential direction.

Figure 2:
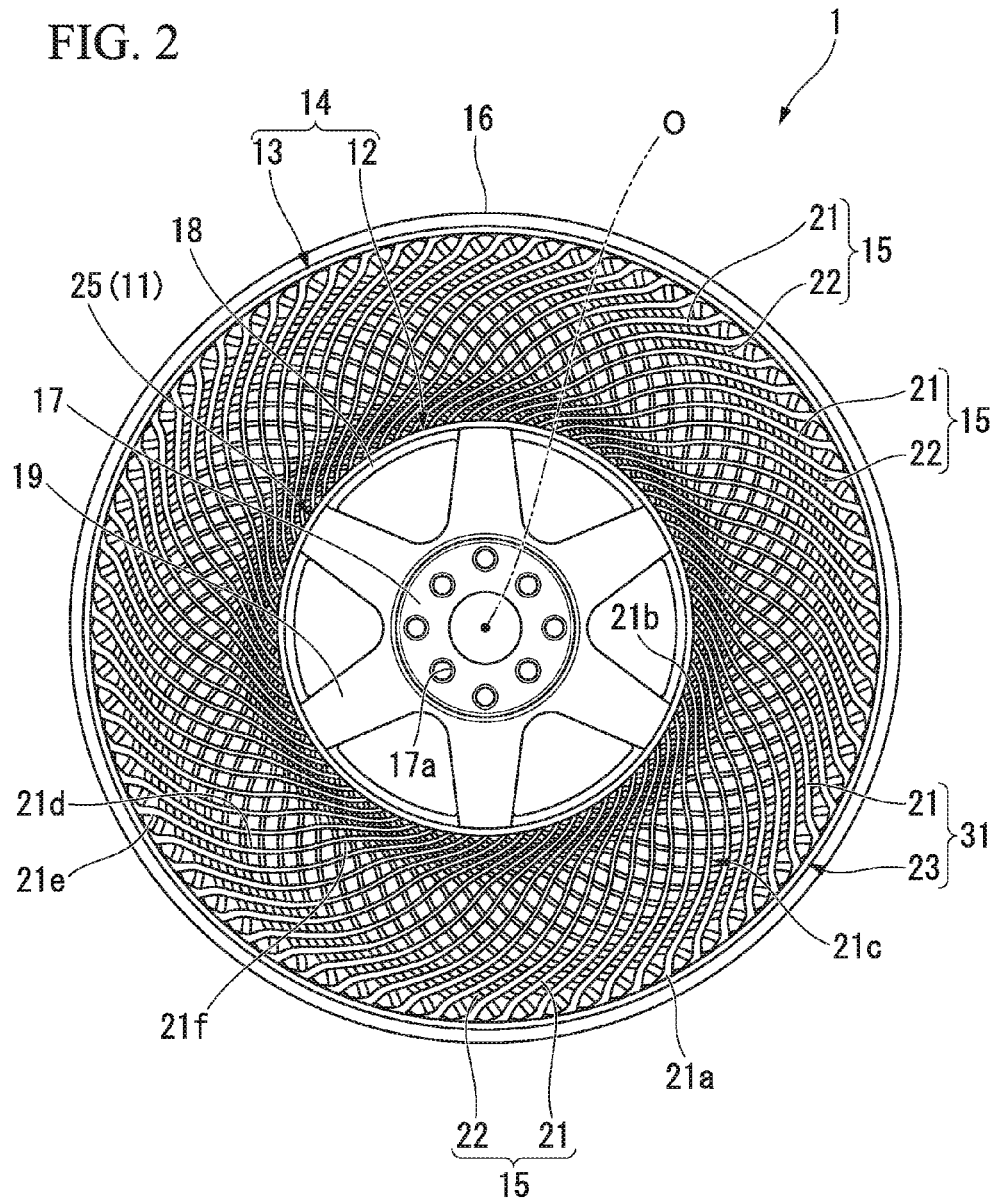
FIG. 2 is a side view of the non-pneumatic tire of FIG. 1 when seen from first side in a tire width direction.

As shown in FIGS. 1 and 2, the connecting member 15 includes a first elastic connecting plate 21 and a second elastic connecting plate 22 configured to connect the inner tubular body 12 and the outer tubular body 13 of the ring member 14 to each other.

The plurality of (in the example shown, 60) connecting members 15 are formed in the tire circumferential direction such that the plurality of first elastic connecting plates 21 are disposed in the tire circumferential direction at predetermined positions in the tire width direction H and the plurality of second elastic connecting plates 22 are disposed in the tire circumferential direction at other positions in the tire width direction H different from the predetermined positions in the tire width direction H.

That is, the plurality of first elastic connecting plates 21 are disposed in the tire circumferential direction at the same positions in the tire width direction H, and the plurality of second elastic connecting plates 22 are disposed in the tire circumferential direction at the same predetermined positions in the tire width direction H spaced apart from the first elastic connecting plate 21 in the tire width direction H.

Further, the plurality of connecting members 15 are disposed between the inner tubular body 12 and the outer tubular body 13 of the ring member 14 at positions that are axially symmetrical with respect to the axis O. In addition, all of the connecting members 15 have the same shape and the same size. Further, the width of the connecting members 15 is smaller than that of the outer tubular body 13.

Additionally, the first elastic connecting plates 21 neighboring in the tire circumferential direction do not come in contact with each other, and the second elastic connecting plates 22 neighboring in the tire circumferential direction do not come in contact with each other either. Further, the first elastic connecting plates 21 and the second elastic connecting plates 22 neighboring them in the tire width direction H do not come in contact with each other either.

Further, widths of the first elastic connecting plates 21 and the second elastic connecting plates 22 are equal to each other. In addition, the thicknesses of the first elastic connecting plates 21 and the second elastic connecting plates 22 are also equal to each other.

Here, first end portions 21a of the first elastic connecting plates 21 connected to the outer tubular body 13 are disposed closer to first side in the tire circumferential direction than the second end portions 21b connected to the inner tubular body 12, and first end portions 22a of the second elastic connecting plates 22 connected to the outer tubular body 13 are disposed closer to the second side in the tire circumferential direction than the second end portions 22b connected to the inner tubular body 12.

In addition, the first end portions 21a and 22a of the first elastic connecting plate 21 and the second elastic connecting plate 22 in each of the connecting members 15 are disposed at different positions in the tire width direction H and connected to the same positions in the tire circumferential direction on the inner circumferential surface of the outer tubular body 13.

In each of the first elastic connecting plates 21 and the second elastic connecting plates 22, a plurality of curved sections 21d to 21f and 22d to 22f curved in the tire circumferential direction are formed at intermediate portions 21c and 22c disposed between the first end portions 21a and 22a and the second end portions 21b and 22b in an extension direction in which the elastic connecting plates 21 and 22 extend, in a tire side view when the tire 1 is seen from the tire width direction H.

In both types of the elastic connecting plates 21 and 22, among the plurality of curved sections 21d to 21f and 22d to 22f, curved directions of the curved sections 21d to 21f and 22d to 22f neighboring in the extension direction are directed in opposite directions.

The plurality of curved sections 21d to 21f formed at the first elastic connecting plates 21 have first curved sections 21d curved to protrude toward the second side in the tire circumferential direction, second curved sections 21e disposed between the first curved sections 21d and the first end portions 21a and curved to protrude toward first side in the tire circumferential direction, and third curved sections 21f disposed between the first curved sections 21d and the second end portions 21b and curved to protrude toward the first side in the tire circumferential direction.

The plurality of curved sections 22d to 22f formed in the second elastic connecting plates 22 have first curved sections 22d curved to protrude toward the first side in the tire circumferential direction, second curved sections 22e disposed between the first curved sections 22d and the first end portions 22a and curved to protrude toward the second side in the tire circumferential direction, and third curved sections 22f disposed between the first curved sections 22d and the second end portions 22b and curved to protrude toward the second side in the tire circumferential direction.

In the example shown, the first curved sections 21d and 22d have larger radii of curvature in the tire side view than the second curved sections 21e and 22e and the third curved sections 21f and 22f. Further, the first curved sections 21d and 22d are disposed at central portions in the extension direction of the first elastic connecting plates 21 and the second elastic connecting plates 22.

Further, lengths of both types of the elastic connecting plates 21 and 22 are equal to each other, and the second end portions 21b and 22b of both types of the elastic connecting plates 21 and 22 are connected to positions spaced the same angle (for example, 20° to 135°) from the positions opposite to the first end portions 21a and 22a in the tire radial direction at the first side and the second side on the outer circumferential surface of the inner tubular body 12 in the tire circumferential direction around the axis O when seen in the tire side view. In addition, the first curved sections 21d and 22d, the second curved sections 21e and 22e, and the third curved sections 21f and 22f of the first elastic connecting plates 21 and the second elastic connecting plates 22 are directed to protrude in opposite directions in the tire circumferential direction and have the same size.

Accordingly, a shape in the tire side view of each of the connecting members 15 is linearly symmetrical with respect to an imaginary line extending in the tire radial direction and passing through the first end portions 21a and 22a of both types of the elastic connecting plates 21 and 22.

In addition, in both types of the elastic connecting plates 21 and 22, first end-side portions from central portions in the extension direction to the first end portions 21a and 22a have thicknesses larger than that of the second end-side portions from the central portions to the second end portions 21b and 22b. Accordingly, strength of the first end-side portions at which large loads are easily applied to the first and second elastic connecting plates 21 and 22 can be increased while suppressing an increase in weight of the connecting member 15 and securing flexibility of the connecting member 15. Further, the first end-side portions and the second end-side portions are smoothly connected with no step difference.

In addition, in the embodiment, the ring member 14 and the plurality of connecting members 15 are integrally formed of a synthetic resin material. Further, the synthetic resin material may be only one kind of resin material, a mixture including two or more kinds of resin materials, or a mixture including one or more kinds of resin materials and one or more kinds of elastomers. Further, the synthetic resin material may include additives such as an anti-oxidant, a plasticizing agent, a filler, a pigment, or the like.

Further, in the embodiment, as shown in FIG. 1, the ring member 14 is split into one split ring member 23 disposed at first side in the tire width direction H, and another split ring member 24 disposed at the second side in the tire width direction H. Further, in the example shown, the ring member 14 is split at a central portion in the tire width direction H.

Additionally, the one split ring member 23 is integrally formed with the first elastic connecting plates 21, and the other split ring member 24 is integrally formed with the second elastic connecting plates 22.

Further, in the embodiment, the one split ring member 23 and the first elastic connecting plates 21 are integrally formed by injection molding, and the other split ring member 24 and the second elastic connecting plates 22 are also integrally formed by injection molding.

Hereinafter, a member formed by integrally forming the one split ring member 23 and the first elastic connecting plates 21 is referred to as a first split case body 31, and a member formed by integrally forming the other split ring member 24 and the second elastic connecting plates 22 is referred to as a second split case body 32.

Here, the injection molding may be a general method of simultaneously forming each of the first and second split case bodies 31 and 32 as a whole, or in each of the first and second split case bodies 31 and 32, may be insert molding in which one of the first and the second split ring members 23 and 24 and one of the first and second elastic connecting plates 21 and 22 may be formed as an insert part and the other may be formed of injection molding, or may be formed by so-called two-color formation or the like.

In addition, in each of the first and second split case bodies 31 and 32, the first and the second split ring members 23 and 24, and the first and second elastic connecting plates 21 and 22 may be formed of different materials or may be formed of the same material. Further, the material may be a metal material, a resin material, or the like, or may be a resin material, in particular, a thermoplastic resin, in view of reduction in weight.

Further, when each of the first and second split case bodies 31 and 32 is simultaneously formed by injection molding as a whole, the plurality of protrusion sections 12a formed at the inner tubular body 12 may be a gate portion.

Figure 3:
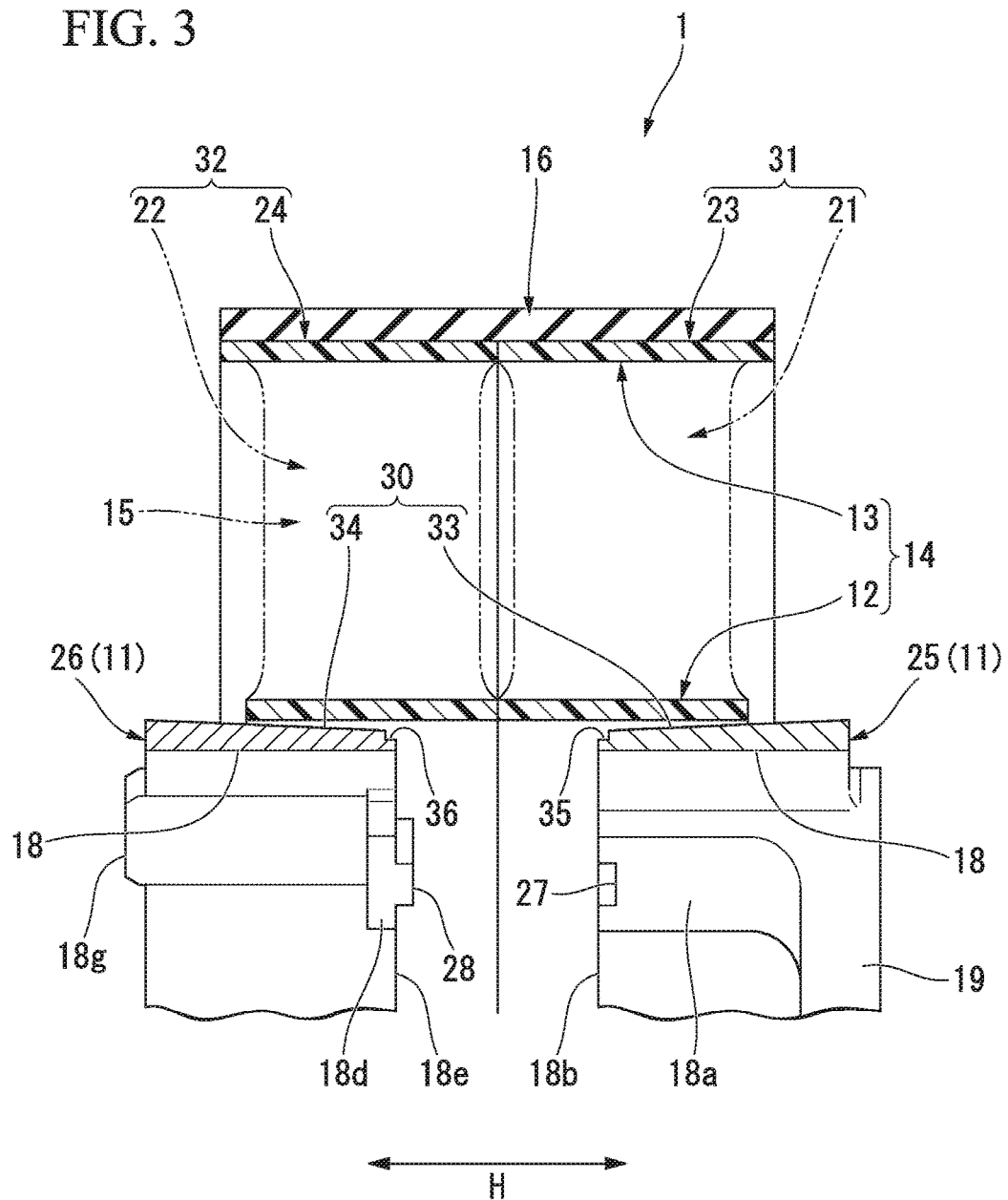
FIG. 3 is a view showing a sequence of fitting an inner tubular body and an attachment body.
Figure 4:
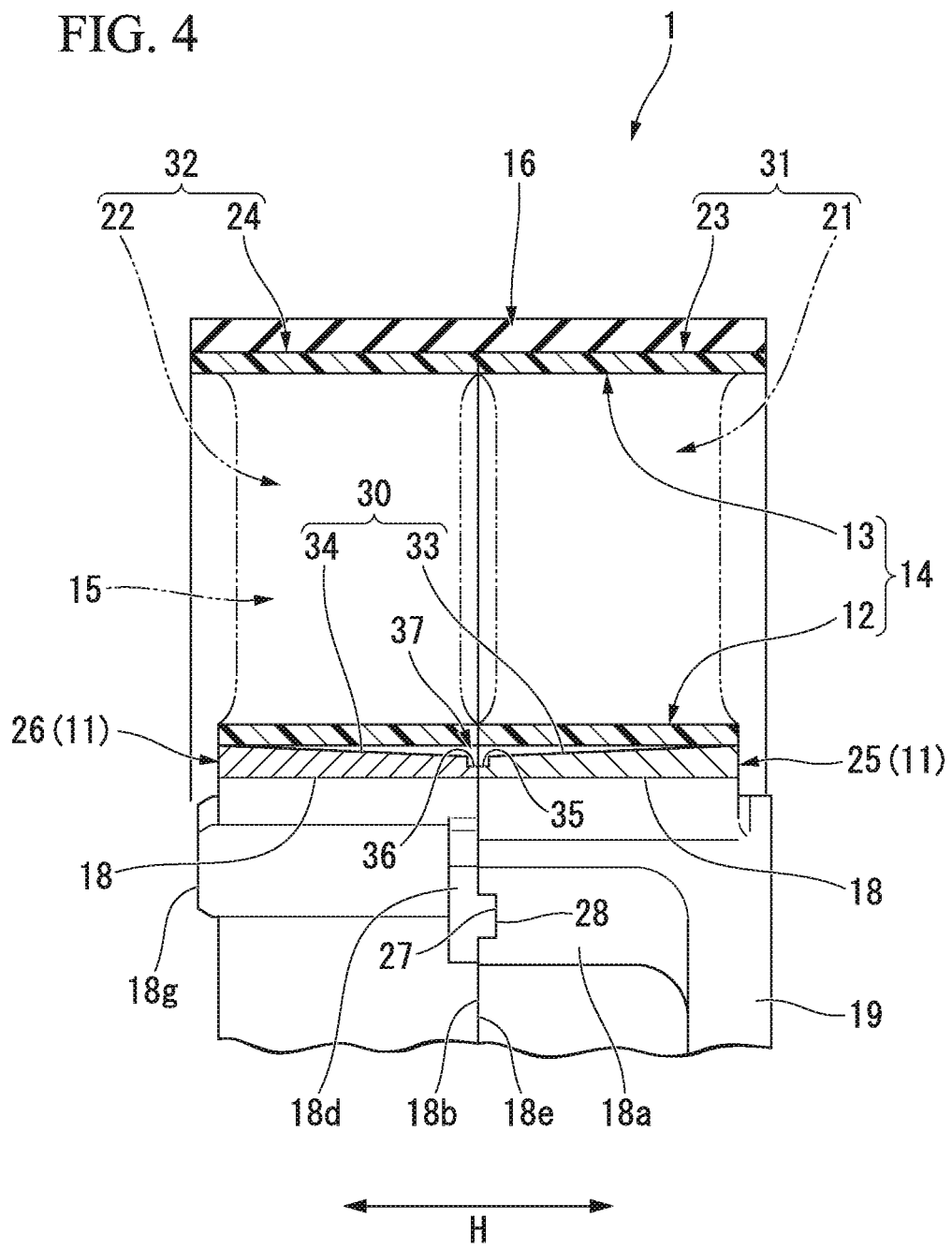
FIG. 4 is a view showing the sequence of fitting the inner tubular body and the attachment body.

In the example shown in FIGS. 3 and 4, in each of the first and second split case bodies 31 and 32, central portions (centers) in the tire width direction H of the inner tubular bodies 12 coincide with central portions in the tire width direction H of the first and second elastic connecting plates 21 and 22. In addition, in each of the first and second split case bodies 31 and 32, central portions in the tire width direction H of the outer tubular bodies 13 are disposed outside in the tire width direction H with respect to the central portions in the tire width direction H of the inner tubular body 12 and the central portions in the tire width direction H of the first and second elastic connecting plates 21 and 22. Further, in each of the first and second split case bodies 31 and 32, the central portions in the tire width direction H of the first and second elastic connecting plates 21 and 22 are disposed outside in the tire width direction H with respect to the central portions in the tire width direction H of the inner tubular bodies 12 and the central portions in the tire width direction H of the outer tubular bodies 13. Alternatively, in each of the first and second split case bodies 31 and 32, the central portions in the tire width direction H of the first and second elastic connecting plates 21 and 22, the central portions in the tire width direction H of the inner tubular bodies 12 and the central portions in the tire width direction H of the outer tubular bodies 13 may coincide with each other.

Then, edges in the tire width direction H of the outer tubular body 13 of the one split ring member 23 and the outer tubular body 13 of the other split ring member 24 are connected by, for example, welding, fusion, adhesion, or the like. Further, among these, in the case of welding, for example, hot plate welding or the like may be employed.

In addition, edges in the tire width direction H of the inner tubular body 12 of the one split ring member 23 and the inner tubular body 12 of the other split ring member 24 are also connected by, for example, welding, fusion, adhesion, or the like. Further, when the inner tubular bodies 12 of both of the split ring members 23 and 24 are welded as described above, burrs may occur on (a welded portion of) the inner circumferential surface of the inner tubular body 12 fitted onto the attachment body 11 from the outside. However, in the embodiment, the burrs are accommodated in a cross section concave V-shaped tapered portion (an outer circumferential section) 30 (to be described below) of the attachment body 11 and the groove 37 disposed at the deepest portion of the cross section concave V-shaped tapered portion 30.

In addition, the first split case body 31 and the second split case body 32 have the same shape and the same size in a state before the case bodies 31 and 32 are connected as described above.

Then, when the case bodies 31 and 32 are connected as described above, the non-pneumatic tire 1 is obtained by butting and connecting the edges in the tire width direction H of the outer tubular bodies 13 and the inner tubular bodies 12 of the first split case body 31 and the second split case body 32 such that the connecting members 15 are line-symmetrical as described above when seen in the tire side view, in a state in which orientations in the tire width direction H of both of the split case bodies 31 and 32 are opposite to each other while positions in the tire circumferential direction of the first split case body 31 and the second split case body 32 are matched.

In FIG. 1, the tread member 16 is formed in a cylindrical shape, and integrally coated on the outer circumferential surface of the outer tubular body 13 of the ring member 14 throughout the region. The tread member 16 is formed of, for example, vulcanized rubber in which natural rubber or/and a rubber composition are vulcanized, a thermoplastic material, or the like.

For example, a thermoplastic elastomer, a thermoplastic resin, or the like, are exemplary examples of the thermoplastic material. For example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), a thermoplastic rubber crosslinked body (TPV), another thermoplastic elastomer (TPZ), or the like, as defined in Japanese Industrial Standard JIS K6418, are also exemplary examples of the thermoplastic elastomer. A urethane resin, an olefin resin, a vinyl chloride resin, a polyamide resin, or the like, are also exemplary examples of the thermoplastic resin. Further, in view of abrasion resistance, the tread member 16 may be formed of vulcanized rubber.

The attachment body 11 includes a mounting ring section 17 on which a front end portion of the axle is mounted, an outer ring section 18 configured to surround the mounting ring section 17 from the outside in the tire radial direction, and a plurality of spokes 19 configured to connect the mounting ring section 17 and the outer ring section 18.

The mounting ring section 17, the outer ring section 18 and the spokes 19 are formed of a metal material such as an aluminum alloy or the like. In the example shown, the mounting ring section 17 is formed in an annular plate shape, and the outer ring section 18 is formed in a cylindrical shape and disposed coaxially with the axis O. A plurality of through-holes 17a through which axle attachment bolts are inserted are formed in the mounting ring section 17 at intervals in the tire circumferential direction. Further, the mounting ring section 17 is formed in a cylindrical shape, and may provide a double cylinder structure together with the outer ring section 18. The plurality of spokes 19 are disposed at equal intervals in the circumferential direction.

In the embodiment, the attachment body 11 includes a pair of split bodies 25 and 26 that are split in the tire width direction H. Each of the pair of split bodies 25 and 26 is formed in a cylindrical shape, and the attachment body 11 is formed by connecting the split bodies 25 and 26 in the tire width direction H.

In the example shown, in the split bodies 25 and 26, the mounting ring section 17 and the spokes 19 are integrally formed with the outer ring section 18 of the one split body 25 disposed at first side in the tire width direction H, and the mounting ring section 17 and the spokes 19 are not formed at the outer ring section 18 of the other split body 26 disposed at the second side of the tire width direction H.

Figure 5:
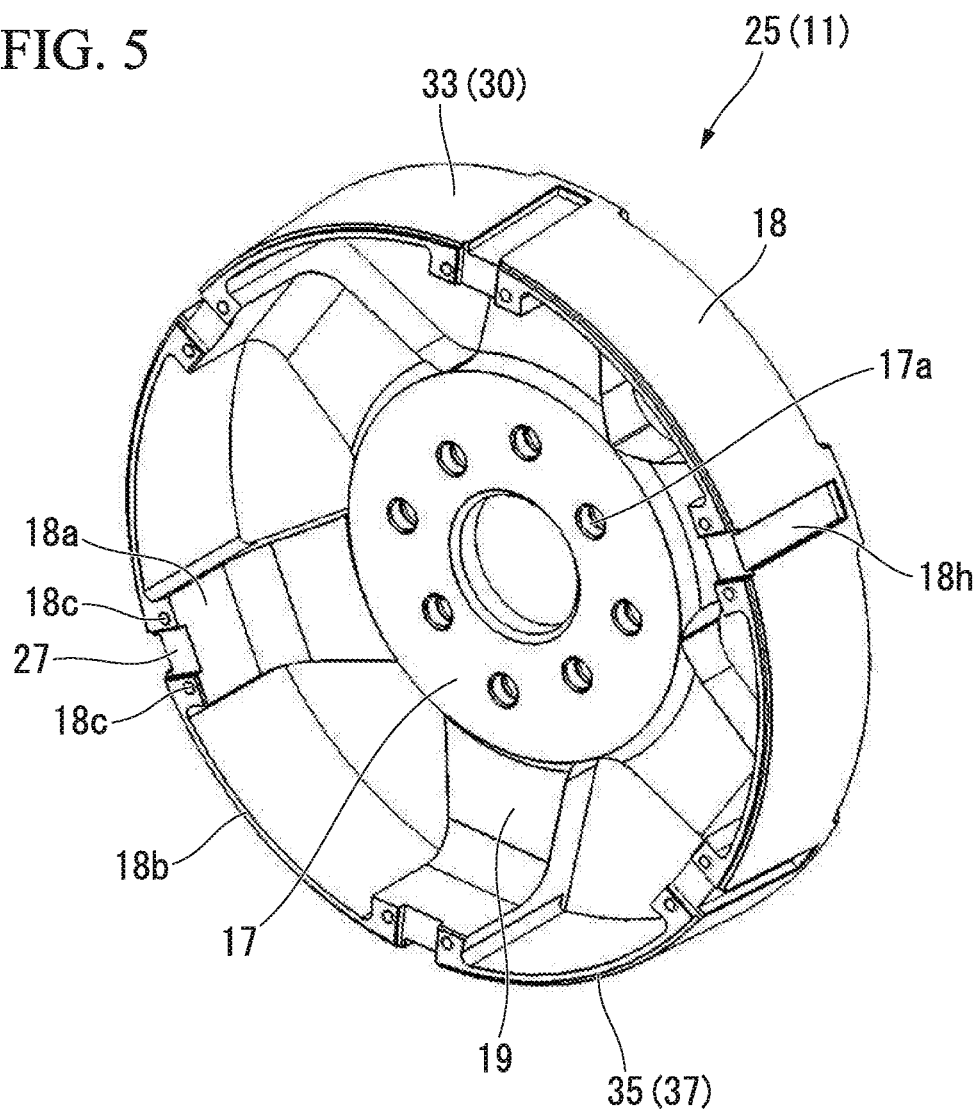
FIG. 5 is a perspective view showing one of a pair of split bodies of the attachment body.

In FIGS. 3 to 5, a plurality of convex ribs 18a are formed at the inner circumferential surface of the outer ring section 18 of the one split body 25 at intervals in the tire circumferential direction. These convex ribs 18a protrude from the inner circumferential surface of the outer ring section 18 inward in the tire radial direction and extend in the tire width direction H, and in the embodiment, a cross section (a cross section in the tire circumferential direction) perpendicular to the tire width direction H of the convex rib 18a is formed in a rectangular shape elongated in the tire circumferential direction. In a cross-sectional view in the tire width direction H shown in FIGS. 3 and 4 (a cross-sectional view in the tire radial direction and also a cross-sectional view perpendicular to the tire circumferential direction), the inner circumferential surface of the outer ring section 18 of the split body 25 extends in the tire width direction H (the axis O), and an inner diameter of the outer ring section 18 is constant in the tire width direction H.

In addition, the pair of split bodies 25 and 26 of the attachment body 11 are split at the central portion in the tire width direction 11 of the non-pneumatic tire 1. That is, in the split bodies 25 and 26, split surfaces 18b and 18e opposite to and abutting each other in the tire width direction H (to be described below) are disposed at the central portion in the tire width direction H of the non-pneumatic tire 1.

An end surface directed inward in the tire width direction H (the second side in the tire width direction H) of the outer ring section 18 of the one split body 25 is the split surface 18b abutting the outer ring section 18 of the other split body 26, and an attachment concave section 27 recessed from the split surface 18b outward in the tire width direction H (first side in the tire width direction H) is formed at a portion of the split surface 18b corresponding to the convex rib 18a. In the example shown, the attachment concave section 27 has a cross section perpendicular to the tire width direction H (a cross-section in the tire circumferential direction) having a rectangular shape elongated in the tire circumferential direction. In addition, in an area of the split surface 18b corresponding to the convex rib 18a, a pair of screw holes 18c extending in the tire width direction H are formed at both sides in the tire circumferential direction of the attachment concave section 27.

In addition, the spokes 19 extend from the outer end portions in the tire width direction HI of the convex ribs 18a (in the embodiment, end portions of a first side in the tire width direction H) inward in the tire radial direction and connect the outer ring section 18 and the mounting ring section 17. In the example shown in FIG. 2, the width in the tire circumferential direction of each of the spokes 19 is gradually increased from the outer ring section 18 inward in the tire radial direction. In addition, as shown in FIGS. 3 and 4, an end surface of the spoke 19 directed outward in the tire width direction H (the right side of FIGS. 3 and 4) protrudes outward in the tire width direction H farther than an end surface of the outer ring section 18 directed outward in the tire width direction H.

Figure 6:
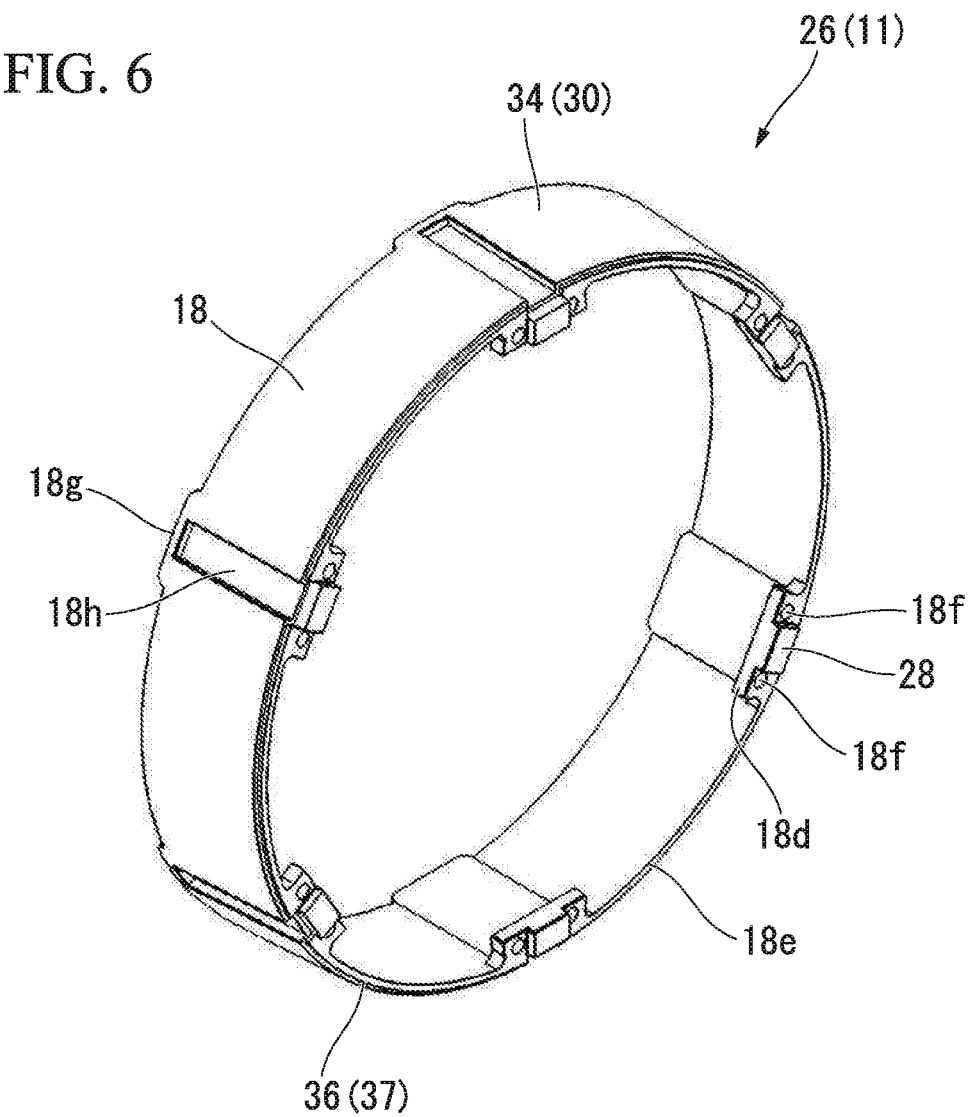
FIG. 6 is a perspective view showing the other split body of the pair of split bodies of the attachment body.

In FIGS. 3, 4 and 6, a plurality of plate sections 18d are formed at the inner circumferential surface of the outer ring section 18 of the other split body 26 at intervals in the tire circumferential direction. The plate sections 18d extends in the tire circumferential direction while protruding from the inner circumferential surface of the outer ring section 18 inward in the tire radial direction, and plate thickness directions thereof coincide with each other in the tire width direction H. In the embodiment, a cross section perpendicular to the tire width direction H of the plate section 18d (a cross section in the tire circumferential direction) has a slender rectangular shape in the tire circumferential direction. When seen in the cross-sectional views shown in FIGS. 3 and 4, the inner circumferential surface of the outer ring section 18 of the split body 26 extends parallel to the tire width direction H (the axis O), and an inner diameter of the outer ring section 18 is constant in the tire width direction H.

The end surface of the outer ring section 18 of the other split body 26 directed inward in the tire width direction H (first side in the tire width direction H) is the split surface 18e abutting the outer ring section 18 of the one split body 25, and an attachment convex section 28 protruding from the split surface 18e inward in the tire width direction H (a first side in the tire width direction H) is formed in an area of the split surface 18e corresponding to the plate section 18d. In the example shown, the attachment convex section 28 has a cross section perpendicular to the tire width direction H (a cross section in the tire circumferential direction) having a slender rectangular shape in the tire circumferential direction. In addition, in an area of the split surface 18e corresponding to the plate section 18d, a pair of bolt insertion holes 18f passing through the plate section 18d in the tire width direction H are formed in both sides in the tire circumferential direction of the attachment convex section 28.

Figure 7:
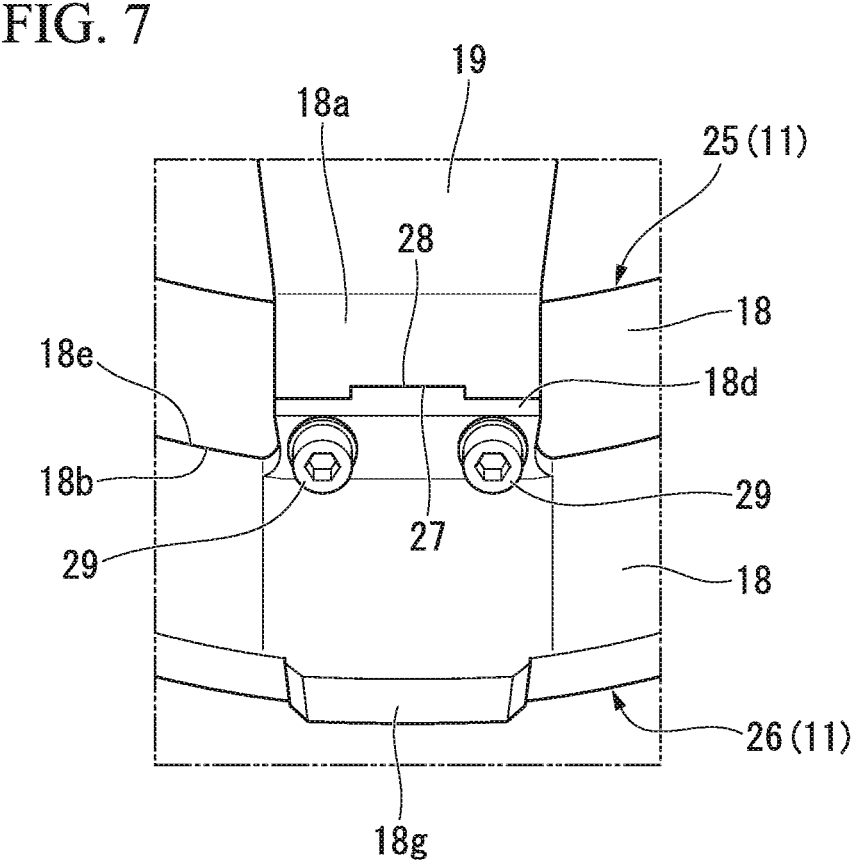
FIG. 7 is a view showing a locking state of an attachment concave section and an attachment convex section, and a fastening member.
Figure 10:
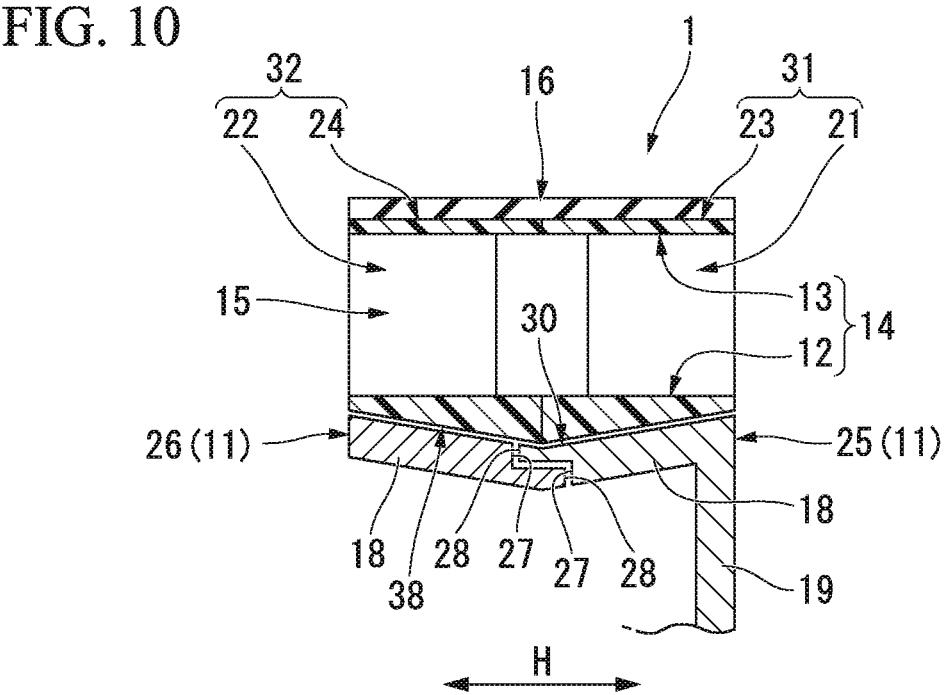
FIG. 10 is a partial cross-sectional view schematically showing the variant of the non-pneumatic tire of the present invention.
Figure 11:
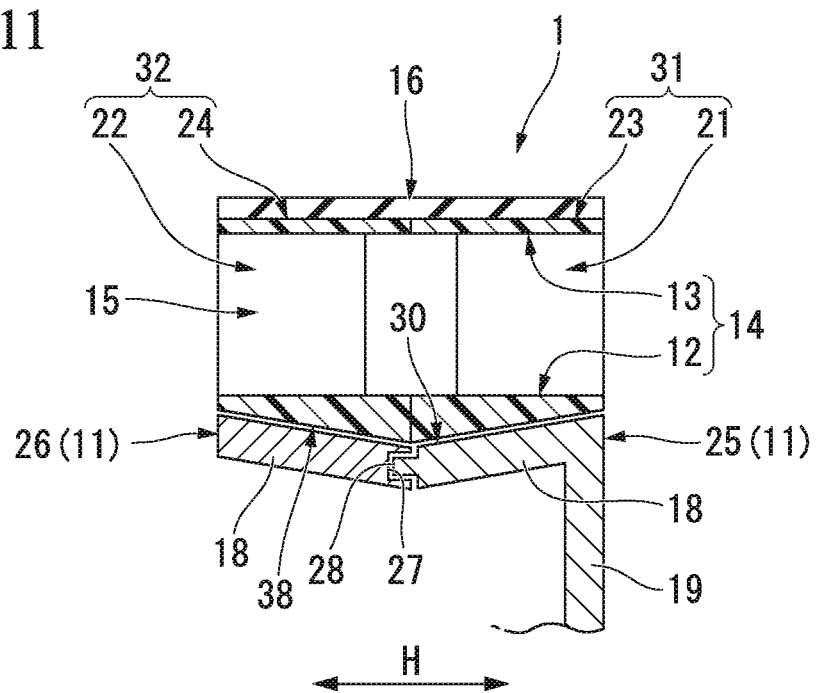
FIG. 11 is a partial cross-sectional view schematically showing the variant of the non-pneumatic tire of the present invention.

As shown in FIGS. 4 and 7, the attachment convex sections 28 formed in the split surface 18c of the other split body 26 are locked to each of the attachment concave sections 27 formed at the split surface 18b of the one split body 25. Specifically, the attachment convex sections 28 are fitted into the attachment concave sections 27, and thus relative movement of the pair of split bodies 25 and 26 in the tire circumferential direction and the tire radial direction is restricted. In addition, in FIG. 7, in a state in which the attachment concave sections 27 and the attachment convex sections 28 are locked to each other, bolts 29 serving as fastening members are inserted through the bolt insertion holes 18f (see FIG. 6) from the outside toward the inside in the tire width direction H, and the bolts 29 are screwed into the screw holes 18c (see FIG. 5) to restrict relative movement of the pair of split bodies 25 and 26 in the tire width direction H using the bolts 29, thereby fixing the split bodies 25 and 26 to each other.

Further, in the embodiment, while the attachment concave sections 27 are formed at the one split body 25 and the attachment convex sections 28 are formed at the other split body 26, in contrast, or together with this, a configuration in which the attachment convex sections 28 are formed at the one split body 25 and the attachment concave sections 27 are formed at the other split body 26 may be provided. Specifically in the split surfaces 18b and 18e of the pair of split bodies 25 and 26, the attachment concave sections 27 are formed at one of the split surfaces 18b and 18e, and the attachment convex sections 28 locked to the attachment concave section 27 are formed at the second split surface. In addition, in the embodiment, while the plurality of attachment concave sections 27 and the plurality of attachment convex sections 28 are formed at the split surfaces 18h and 18e at intervals in the tire circumferential direction, respectively, only one attachment concave section 27 and only one attachment convex section 28 may be formed at the split surfaces 18b and 18e, respectively. Further, when the plurality of attachment concave sections 27 and the plurality of attachment convex sections 28 are formed at the split surfaces 18b and 18e, three or more attachment concave sections 27 and three or more attachment convex sections 28 may be formed at the split surfaces 18b and 18e at equal intervals in the tire circumferential direction.

In addition, as shown in FIGS. 3 to 7, projections 18g protruding outward in the tire width direction H are formed at the end surface of the outer ring section 18 of the other split body 26 directed outward in the tire width direction H (the second side in the tire width direction H, the left side in FIGS. 3 and 4) at positions corresponding to the plate sections 18d in the tire circumferential direction of the end surface.

In the example shown in FIG. 4, a length in the tire width direction H of the outer ring section 18 of each of the split bodies 25 and 26 is equal to a length in the tire width direction HI of the inner tubular body 12 of each of the split ring members 23 and 24. In addition, central portions in the tire width direction H of the outer ring sections 18 of the split bodies 25 and 26 coincide with central portions in the tire width direction H of the inner tubular bodies 12 of the split ring members 23 and 24 at positions in the tire width direction H, respectively.

Then, when seen in cross-sectional views in the tire width direction H shown in FIGS. 3 and 4 (a cross-sectional view in the tire radial direction and a cross-sectional view perpendicular to the tire circumferential direction), the outer circumferential section of the attachment body 11 is inclined from the outside toward the inside in the tire radial direction as it goes from both of the outsides in the tire width direction H toward the inside throughout the circumference in the tire circumferential direction, and forms a V shape when seen in the cross-sectional view. Specifically, the outer circumferential section of the attachment body 11 is the cross section concave V-shaped tapered portion 30 to which the inner circumferential section of the inner tubular body 12 is locked.

In the embodiment, in the cross-sectional views shown in FIGS. 3 and 4, the cross section concave V-shaped tapered portion 30 is gradually inclined at a certain inclination angle from the outside toward the inside in the tire radial direction as it goes from both of the outsides toward the inside in the tire width direction H. In addition, the cross section concave V-shaped tapered portion 30 is formed at the outer circumferential surface of the attachment body 11 throughout the region in the tire width direction H, and has a depth that gradually deepens inward in the tire radial direction as it goes from both of the outsides in the tire width direction H toward the inside in the tire width direction H. In this way, the outer circumferential surface of the attachment body 11 is the outer circumferential section throughout the region in the tire width direction H, and is inclined from the outside toward the inside in the tire radial direction as it goes from both of the outer ends in the tire width direction H toward the inside in the tire width direction H.

Further, like the embodiment, a configuration in which the cross section concave V-shaped tapered portion 30 is gradually inclined from the outside toward the inside in the tire radial direction as it goes from both of the outsides toward the inside in the tire width direction H, and instead of this or together with this, the inner circumferential section of the inner tubular body 12 is gradually inclined from the outside toward the inside in the tire radial direction as it goes from both of the outsides toward the inside in the tire width direction H is also included in the present invention (see a variant of the embodiment shown in FIGS. 8 to 14; the variant will be described below). That is, in the present invention, when seen in the cross-sectional views of FIGS. 3 and 4, at least one of the inner circumferential section of the inner tubular body 12 and the cross section concave V-shaped tapered portion (the outer circumferential section of the attachment body 11) 30 that are locked to each other is inclined from the outside toward the inside in the tire radial direction as it goes from both of the outsides toward the inside in the tire width direction H throughout the circumference in the tire circumferential direction, and forms a V shape when seen in a cross-sectional view in the tire width direction H. Further, in the cross-sectional views in the tire width direction H shown in FIGS. 8 to 13, when the inclination is applied to the inner circumferential section of the inner tubular body 12, in the cross-sectional view, the inner circumferential section forms a cross section convex V-shaped tapered portion 38.

In the embodiment, tapered surfaces 33 and 34 gradually inclined from the outside toward the inside in the tire radial direction as they go from the outside toward the inside in the tire width direction H are formed at the outer circumferential surfaces of the outer ring sections 18 of the pair of split bodies 25 and 26 when seen in the cross-sectional views in the tire width direction H shown in FIGS. 3 and 4 (a cross-sectional view in the tire radial direction and a cross-sectional view perpendicular to the tire circumferential direction), and the tapered surfaces 33 and 34 are formed at the outer circumferential surfaces of the outer ring sections 18 of the split bodies 25 and 26 throughout the circumference in the tire circumferential direction. In addition, when seen in the cross-sectional view, orientations of inclinations of the tapered surfaces 33 and 34 with respect to the axis O are opposite to each other (reverse orientations), and sizes (absolute values) of inclination angles with respect to the axis O are equal to each other. Then, the cross section concave V-shaped tapered portion 30 at which the central portion in the tire width direction H is the deepest portion is formed at the outer circumferential section of the attachment body 11 by the tapered surfaces 33 and 34.

The tapered surface 33 is formed at the outer circumferential surface of the outer ring section 18 of the one split body 25, and gradually inclined from the outside toward the inside in the tire radial direction as it goes from the outside in the tire width direction H (first side in the tire width direction H) toward the inside (the second side in the tire width direction H).

The tapered surface 34 is formed at the outer circumferential surface of the outer ring section 18 of the other split body 26, and gradually inclined from the outside toward the inside in the tire radial direction as it goes from the outside in the tire width direction H (the second side in the tire width direction H) toward the inside (the first side in the tire width direction).

In addition, in the outer circumferential surfaces (the cross section concave V-shaped tapered portion 30) of the outer ring sections 18 of the pair of split bodies 25 and 26, outer diameters of end portions of both of the outsides (both of the outer end portions) in the tire width direction H are equal to or larger than the inner diameter of the inner tubular body 12. In addition, in the outer circumferential surfaces of the outer ring sections 18 of the split bodies 25 and 26, an outer diameter of a portion in the tire width direction H except for both of the outer end portions is smaller than the inner diameter of the inner tubular body 12. Accordingly, in the embodiment, in FIGS. 3 and 4, when the pair of split bodies 25 and 26 approach each other in the tire width direction H and the split surfaces 18b and 18e abut each other, both of the outer end portions in the tire width direction H of the outer circumferential section of the outer ring section 18 that form the cross section concave V-shaped tapered portion 30 are caulked and locked to both of the outer end portions in the tire width direction H of the inner circumferential section of the inner tubular body 12.

In the outer circumferential surfaces of the outer ring sections 18 of the pair of split bodies 25 and 26, annular stepped sections 35 and 36 recessed inward in the tire radial direction further than the portion other than the inner end portion and extending in the tire circumferential direction are formed at the end portions inside in the tire width direction H (the inner end portions). As shown in FIG. 4, when the split bodies 25 and 26 are connected in the tire width direction H, the stepped sections 35 and 36 are disposed to be adjacent to each other in the tire width direction H, and a groove 37 constituted by the stepped sections 35 and 36 is formed at the central portion in the tire width direction H of the cross section concave V-shaped tapered portion 30. The groove 37 is disposed at the deepest portion (in the example shown, the central portion) in the tire width direction H of the cross section concave V-shaped tapered portion 30, and extends throughout the circumference in the tire circumferential direction at the deepest portion. Burrs generated when the inner tubular bodies 12 of the split ring members 23 and 24 are welded can be accommodated in the central portion in the tire width direction H of the cross section concave V-shaped tapered portion 30 and the groove 37 formed in the central portion.

In FIGS. 1, 5 and 6, a plurality of key groove sections 18h recessed inward in the tire radial direction and extending in the tire width direction H are formed at the outer circumferential surfaces of the outer ring sections 18 of the split bodies 25 and 26 at intervals in the tire circumferential direction. The key groove sections 18h are opened only at the inside of both ends in the tire width direction H and closed at the outside in the outer circumferential surfaces of the outer ring sections 18. The protrusion sections 12a of the inner tubular body 12 of the ring member 14 are fitted into the key groove sections 18h. In the example shown, in the outer circumferential surface of the outer ring section 18, the key groove sections 18h are disposed at each of positions corresponding to the convex ribs 18a and the spokes 19 in the tire circumferential direction of the split body 25 and positions corresponding to the plate section 18d in the tire circumferential direction of the split body 26.

Further, among the wall surfaces that define the key groove sections 18h, pairs of side wall surfaces and bottom wall surfaces that are opposite to each other in the tire circumferential direction form right angles. In addition, among the outer surfaces of the protrusion sections 12a, pairs of side wall surfaces standing up from the inner circumferential surface of the inner tubular body 12 and top wall surfaces directed inward in the tire radial direction form right angles. Sizes in the tire circumferential direction of the protrusion sections 12a and the key groove sections 18h are equal to each other.

Then, the ring member 14 is fixed to the attachment body 11 by screwing the bolts 29 into the screw holes 18c through the bolt insertion holes 18f in a state in which the inner tubular body 12 is fitted onto the attachment body 11 from the outside and the protrusion sections 12a are fitted into the key groove sections 18h, i.e., in a state in which the split bodies 25 and 26 of the attachment body 11 are connected at an inner circumferential side of the inner tubular body 12 in the tire width direction H. In this state, the protrusion sections 12a are sandwiched in the tire width direction H between both of the outer end wall surfaces positioned at both outsides in the tire width direction H and directed inward among the wall surfaces that define the key groove section 18h.

That is, in the embodiment, as described above, as the inner circumferential section of the inner tubular body 12 and the cross section concave V-shaped tapered portion (the outer circumferential section of the attachment body 11) 30 of the attachment body 11 are locked, relative movement (sliding movement) of the inner tubular body 12 and the attachment body 11 in the tire width direction H is restricted, and even as the protrusion sections 12a of the inner tubular body 12 are inserted into the key groove sections 18h of the attachment body 11 from the tire width direction H, relative movement of the inner tubular body 12 and the attachment body 11 in the tire width direction H is restricted.

Further, a plurality of weight-reduction holes (not shown) passing in the tire radial direction may be formed at a portion of the outer ring section 18 disposed between the key groove sections 18h neighboring in the tire circumferential direction at intervals in the tire circumferential direction. In addition, even in the spokes 19, weight-reduction holes (not shown) passing in the tire width direction H may be formed.

According to the non-pneumatic tire 1 of the embodiment as described above, at least one of the inner circumferential section of the inner tubular body 12 and the outer circumferential section of the attachment body 11 is formed in a tapered shape that is inclined from the outside toward the inside in the tire radial direction as it goes from both of the outsides toward the inside in the tire width direction H throughout the circumference in the tire circumferential direction, and forms a V shape when seen in the cross-sectional view in the tire width direction H. As a result, as the inner circumferential section of the inner tubular body 12 and the outer circumferential section of the attachment body 11 are locked, a resistance force when there is relative movement between the inner tubular body 12 and the attachment body 11 in the tire width direction H can be increased.

Specifically, in the embodiment, as shown in FIG. 4, the cross section concave V-shaped tapered portion 30 is formed at the outer circumferential section of the attachment body 11 throughout the circumference in the tire circumferential direction in a tapered shape that is gradually inclined from the outside toward the inside in the tire radial direction as it goes from both of the outsides toward the inside in the tire width direction H (in the example shown, central portions in the tire width direction H of the non-pneumatic tire 1 disposed on the split surfaces 18b and 18e), and the cross section concave V-shaped tapered portion 30 is locked to both of the outer end portions in the tire width direction H of the inner circumferential section of the inner tubular body 12 having a constant inner diameter in the tire width direction H.

In addition, in a variant of the embodiment shown in FIGS. 8 to 11, the cross section concave V-shaped tapered portion 30 is formed in a tapered shape throughout the circumference in the tire circumferential direction that is inclined from the outside toward the inside in the tire radial direction as it goes from both of the outsides toward the inside in the tire width direction H, the inner circumferential section of the inner tubular body 12 is formed in a tapered shape throughout the circumference in the tire circumferential direction that is inclined from the outside toward the inside in the tire radial direction as it goes from both of the outsides toward the inside in the tire width direction H, and thus the inner circumferential section of the inner tubular body 12 forms the cross section convex V-shaped tapered portion 38 having a V shape when seen in the cross-sectional view in the tire width direction H shown in FIGS. 8 to 11. In addition, the cross section convex V-shaped tapered portion 38 is formed at the inner circumferential surface of the inner tubular body 12 throughout the region in the tire width direction H, and has a protrusion amount that gradually increases inward in the tire radial direction as it goes from both of the outsides in the tire width direction H inward in the tire width direction H. The inner circumferential surface of the inner tubular body 12 is the inner circumferential section throughout the region in the tire width direction H as described above, and is inclined from the outside toward the inside in the tire radial direction as it goes from both of the outer ends in the tire width direction H inward in the tire width direction H.

Then, when seen in the cross-sectional views shown in FIGS. 8 to 11, inclination angles of the tapered surfaces (the tapered surfaces 33 and 34) of the cross section concave V-shaped tapered portion 30 with respect to the axis O and inclination angles of the tapered surfaces of the cross section convex V-shaped tapered portion 38 corresponding to the tapered surfaces (disposed to oppose each other in the tire radial direction) with respect to the axis O are equal to each other. Accordingly, the cross section concave V-shaped tapered portion 30 and the cross section convex V-shaped tapered portion 38 come in surface contact with each other throughout the region in the tire width direction H to be locked to each other.

Figure 12:
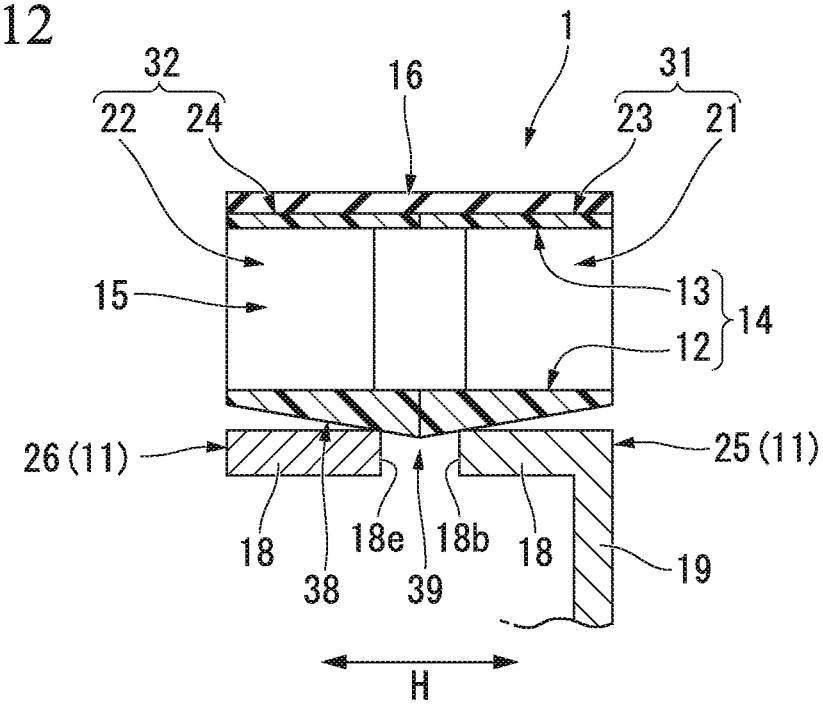
FIG. 12 is a partial cross-sectional view schematically showing the variant of the non-pneumatic tire of the present invention.

In addition, in the variant of the embodiment shown in FIG. 12, concave sections 39 recessed from the outer circumferential surface of the outer ring section 18 inward in the tire radial direction are formed at the inner portions in the tire width direction H (the central portions in the tire width direction H) of the outer ring sections 18 of the pair of split bodies 25 and 26, and in the example shown, the concave section 39 is formed to pass through the outer ring section 18 in the tire radial direction. In addition, the inner circumferential section of the inner tubular body 12 is the cross section convex V-shaped tapered portion 38, and the inner portion (the central portion) in the tire width direction H of the cross section convex V-shaped tapered portion 38 is locked into the concave section 39 of the outer circumferential section of the attachment body 11.

Figure 13:
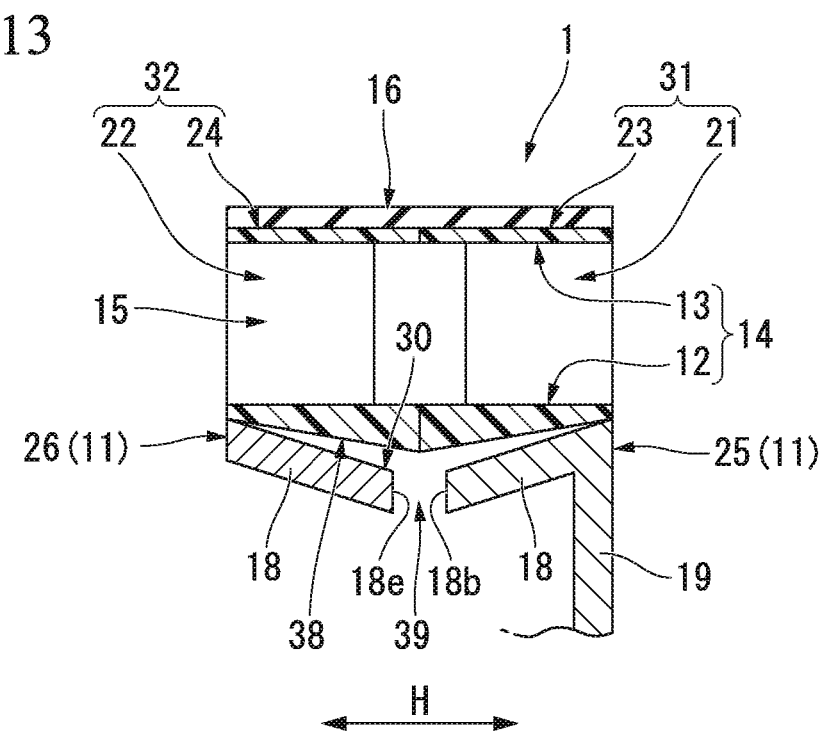
FIG. 13 is a partial cross-sectional view schematically showing the variant of the non-pneumatic tire of the present invention.

In addition, in the variant of the embodiment shown in FIG. 3, the cross section convex V-shaped tapered portion 38 is formed at the inner circumferential section of the inner tubular body 12, and the cross section concave V-shaped tapered portion 30 is formed at the outer circumferential section of the attachment body 11. While this point is similar to the variant of FIGS. 8 to 11 as described above, in the variant, when seen in the cross-sectional view shown in FIG. 13, compared to displacement in the tire radial direction of the cross section concave V-shaped tapered portion 30 per unit length in the tire width direction H (i.e., inclination angles of the tapered surfaces (the tapered surfaces 33 and 34) of the cross section concave V-shaped tapered portion 30 with respect to the axis O when seen in the cross-sectional view), displacement in the tire radial direction of the cross section convex V-shaped tapered portion 38 per unit length in the tire width direction H (i.e., inclination angles of the tapered surfaces of the cross section convex V-shaped tapered portion 38 with respect to the axis O when seen in the cross-sectional view) is smaller. Accordingly, the cross section concave V-shaped tapered portion 30 is locked to both of the outer end portions in the tire width direction HI of the cross section convex V-shaped tapered portion 38. Further, in the example shown in FIG. 13, the concave section 39 passing through the attachment body 11 in the tire radial direction is formed in the central portion in the tire width direction H of the outer circumferential section (the cross section concave V-shaped tapered portion 30) of the attachment body 11.

In this way, at least one of the inner circumferential section (the cross section convex V-shaped tapered portion 38) of the inner tubular body 12 and the outer circumferential section (the cross section concave V-shaped tapered portion 30 or the concave section 39) of the attachment body 11 that are locked to each other is inclined throughout the circumference in the tire circumferential direction from the outside toward the inside in the tire radial direction as it goes from both of the outsides toward the inside in the tire width direction H, and has a V shape when seen in the cross-sectional view in the tire width direction H. According to the above-mentioned configuration, relative movement of the inner tubular body 12 and the attachment body 11 in the tire width direction H can be restricted, and positional deviation of the inner tubular body 12 and the attachment body 11 in the tire width direction H is reliably prevented. In addition, the fixed strength of the inner tubular body 12 and the attachment body 11 can be improved.

Further, when the outer circumferential section of the attachment body 11 is formed at the cross section concave V-shaped tapered portion 30, the capacity of the attachment body 11 can be reduced according to the depression amount of the outer circumferential section, and for example, when the attachment body 11 is formed of a metal material and the inner tubular body 12 is formed of a synthetic resin material, the entire weight of the non-pneumatic tire 1 can be reduced.

Further, the "V shape when seen in the cross-sectional view in the tire width direction H" in the embodiment includes, for example, a V shape formed by a plurality of straight lines, a V shape formed by curved lines, a V shape having a step difference, or the like, in addition to the V shape formed by two straight lines. Specifically, the "V shape" capable of restricting relative movement of the attachment body 11 and the inner tubular body 12 in the tire width direction H when the inner tubular body 12 is fitted onto the attachment body 11 from the outside may be used.

In addition, in the embodiment, since the attachment body 11 includes the pair of split bodies 25 and 26 that are split in the tire width direction H, the following effects are exhibited.

That is, in the present invention, as described above, since at least one of the inner circumferential section of the inner tubular body 12 and the outer circumferential section of the attachment body 11 is formed in the tapered shape, as described in the embodiment, as the attachment body 11 includes the pair of split bodies 25 and 26 that are split in the tire width direction H, the split bodies 25 and 26 can be easily fitted into the inner tubular body 12 while approaching each other in the tire width direction H, and assemblability of the inner tubular body 12 and the attachment body 11 is improved. That is, according to the above-mentioned configuration, since caulking and fitting by the taper is performed, the attachment body 11 can be simply inserted into the inner tubular body 12 without using a large-scaled facility, and the inner tubular body 12 and the attachment body 11 can be reliably fitted and fixed.

Specifically, in the related art, the inner circumferential section of the inner tubular body and the outer circumferential section of the attachment body have constant diameters throughout the region in the tire width direction H, and it may be difficult to fit the inner tubular body and the attachment body to each other. That is, the attachment body may not be inserted into the inner tubular body or the attachment body may rattle in the inner tubular body and not be easy to fix therein, and in order to reliably fit the inner tubular body and the attachment body, fitting dimensional accuracy therebetween should be sufficiently increased and manufacturing thereof is complicated.

Meanwhile, according to the above-mentioned configuration of the embodiment, as the inner tubular body 12 and the attachment body 11 are caulked and fitted, since the inner tubular body 12 and the attachment body 11 are reliably fitted easily without rattling, high dimensional accuracy like the related art is not needed and the manufacture thereof becomes easy.

In addition, since the attachment concave section 27 is formed at either of the split surfaces 18b and 18e of the pair of split bodies 25 and 26 and the attachment convex section 28 locked to the attachment concave section 27 is formed at the second split surface, the following effects are exhibited.

That is, in the case in which the attachment body 11 is fitted into the inner tubular body 12, when the pair of split bodies 25 and 26 approach each other in the tire width direction H and cause the split surfaces 18b and 18e to abut each other, as the attachment concave section 27 and the attachment convex section 28 of the split surfaces 18b and 18e are locked to each other, since relative movement of the split bodies 25 and 26 in the tire circumferential direction or/and the tire radial direction is restricted, the non-pneumatic tire 1 can be stabilized and used.

Specifically, in the embodiment, as shown in FIGS. 3 to 7, as the attachment concave section 27 has a pair of inner sidewalls directed in the tire circumferential direction, the attachment convex section 28 has a pair of outer sidewalls directed in the tire circumferential direction, and the inner sidewalls and the outer sidewalls are locked in the tire circumferential direction, relative movement of the split bodies 25 and 26 in the tire circumferential direction is restricted. In addition, as the plurality of attachment concave sections 27 and the plurality of attachment convex sections 28 are formed in the split surfaces 18b and 18e at intervals in the tire circumferential direction, relative movement of the split bodies 25 and 26 in the tire radial direction is also restricted.

Specifically, when three or more attachment concave sections 27 and three or more attachment convex sections 28 are disposed in the split surfaces 18b and 18e at equal intervals in the tire circumferential direction, an effect of restricting relative movement of the split bodies 25 and 26 in the tire radial direction is likely to be more reliably obtained.

In addition, in the embodiment, since the outer circumferential surface of the attachment body 11 is the outer circumferential section throughout the region in the tire width direction H and functions as the cross section concave V-shaped tapered portion 30, and is inclined from the outside toward the inside in the tire radial direction as it goes from both of the outer ends in the tire width direction H inward in the tire width direction H, the following effects are exhibited.

That is, since the outer circumferential surface of the attachment body 11 is the outer circumferential section (the cross section concave V-shaped tapered portion 30) having a tapered shape throughout the region in the tire width direction H, the above-mentioned effects can be more stably obtained. In addition, locking positions of the outer circumferential section of the attachment body 11 and the inner circumferential section of the inner tubular body 12 can be disposed at both of the outer portions (both of the outer end portions) in the tire width direction H as described in the embodiment, and in this case, mounting stability of the inner tubular body 12 with respect to the attachment body 11 can be further improved.

In addition, since the pair of split bodies 25 and 26 are fixed to each other by bolts (fastening members) 29, the attachment body 11 can be split in the tire width direction H while obtaining the above-mentioned effects, disassembly of the assembled attachment body 11 can be prevented, and the non-pneumatic tire 1 can be stably used.

In addition, in the embodiment, the protrusion sections 12a of the inner tubular body 12 are sandwiched between both of the outer end wall surfaces of the key groove sections 18h of the attachment body 11 from the tire width direction H. For this reason, in cooperation with the effects by the above-mentioned locking of the inner circumferential section of the inner tubular body 12 and the outer circumferential section of the attachment body 11, relative movement of the inner tubular body 12 and the attachment body 11 in the tire width direction H is more reliably restricted.

Further, the present invention is not limited to the above-mentioned embodiment but various modifications may be made without departing from the spirit of the present invention.

For example, in the above-mentioned embodiment, while the attachment body 11 has the pair of split bodies 25 and 26 that are split in the tire width direction H and the split bodies 25 and 26 are connected in the tire width direction H, the attachment body is not limited thereto. That is, the attachment body 11 may be integrally formed without being split, and in this case, the attachment body 11 and the inner tubular body 12 may be fitted by, for example, insert molding, press-fitting, or the like.

In addition, in the above-mentioned embodiment, while the pair of split bodies 25 and 26 of the attachment body 11 have been described as having the mounting ring section 17 and the spokes 19 installed at the outer ring section 18 of the one split body 25 and the mounting ring section 17 and the spokes 19 not installed at the outer ring section 18 of the other split body 26, the split bodies are not limited thereto. That is, instead of the mounting ring section 17 and the spokes 19 installed at the outer ring section 18 of the one split body 25, or together with this, the mounting ring section 17 and the spokes 19 may be installed at the outer ring section 18 of the other split body 26. When the mounting ring sections 17 and the spokes 19 are installed at the outer ring sections 18 of the split bodies 25 and 26, respectively, for example, the split bodies can be easily applied to a motorcycle or the like.

In addition, in the above-mentioned embodiment, while the example in which the bolts 29 are used as fastening members configured to fasten and fix the pair of split bodies 25 and 26 has been described, the fastening members are not limited thereto. That is, in addition to the bolts 29, for example, nuts, plate members, or the like, may be used as the fastening members configured to fix the split bodies 25 and 26.

In addition, in the above-mentioned embodiment, while the cross section concave V-shaped tapered portion 30 that is the outer circumferential section of the attachment body 11 is formed throughout the region in the tire width direction H of the outer circumferential surface of the attachment body 11, the cross section concave V-shaped tapered portion 30 may not be formed at a portion of the outer circumferential surface of the attachment body 11 that is not locked to the inner circumferential section of the inner tubular body 12. That is, a portion of the outer circumferential surface of the attachment body 11 other than the outer circumferential section (a portion not locked to the inner circumferential section of the inner tubular body 12) may not be inclined from the outside toward the inside in the tire radial direction as it goes from both of the outsides toward the inside in the tire width direction H, and the shape thereof is not limited.

In addition, in the variant of the above-mentioned embodiment, while the cross section convex V-shaped tapered portion 38 that is the inner circumferential section of the inner tubular body 12 is formed throughout the region in the tire width direction H of the inner circumferential surface of the inner tubular body 12, the cross section convex V-shaped tapered portion 38 may not be formed at a position of the inner circumferential surface of the inner tubular body 12 that is not locked to the outer circumferential section of the attachment body 11. That is, a portion of the inner circumferential surface of the inner tubular body 12 other than the inner circumferential section (a portion that is not locked to the outer circumferential section of the attachment body 11) may not be inclined from the outside toward the inside in the tire radial direction as it goes from both of the outsides toward the inside in the tire width direction H, and the shape thereof is not limited.

In addition, in the above-mentioned embodiment, while the attachment concave sections 27 and the attachment convex sections 28 are formed at the split surfaces 18b and 18e of the pair of split bodies 25 and 26, as shown in FIGS. 8 and 9, the attachment concave section 27 and the attachment convex section 28 not may be formed at the split surfaces 18b and 18e. Further, in this case, as shown in the cross-sectional view of FIG. 9, as either of the pair of split surfaces 18b and 18e is formed in a tapered shape that is gradually inclined from the first side toward the second side (or from the second side toward the first side) in the tire width direction H as it goes from the outside toward the inside in the tire radial direction and the second split surface different from the first split surface is also formed in a tapered shape that is gradually inclined from the first side toward the second side (or from the second side toward the first side) in the tire width direction H to correspond to the inclination of the first split surface as it goes from the outside toward the inside in the tire radial direction, relative movement of the split bodies 25 and 26 in the tire radial direction is restricted.

In addition, in the above-mentioned embodiment, while the example in which the pair of inner sidewalls directed in the tire circumferential direction of the attachment concave section 27 and the pair of outer sidewalls directed in the tire circumferential direction of the attachment convex section 28 are locked to each other in the tire circumferential direction has been described, a surface of the portion is not limited thereto. That is, as shown in the cross-sectional views of FIGS. 10 and 11, the attachment concave section 27 and the attachment convex section 28 may be locked to each other in the tire radial direction. In this case, relative movement of the split bodies 25 and 26 in the tire radial direction is restricted.

Figure 14:
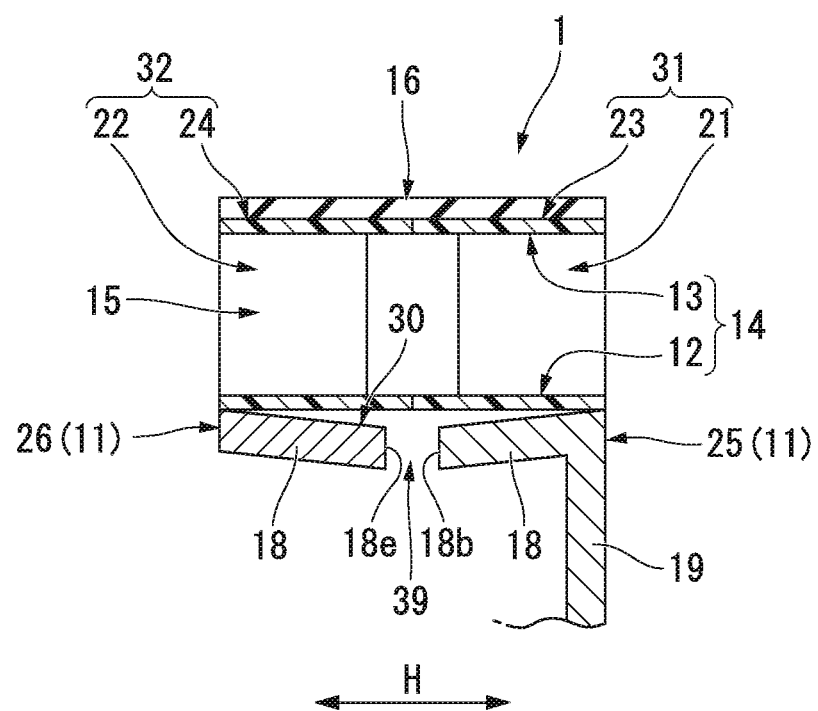
FIG. 14 is a partial cross-sectional view schematically showing the variant of the non-pneumatic tire of the present invention.

In addition, in the above-mentioned embodiment while the split surfaces 18b and 18e of the split bodies 25 and 26 abut each other, as shown in the cross-sectional views of FIGS. 12 to 14, the split surfaces 18b and 18e may not partially (including at a plurality of portions) or entirely abut each other. Further, as shown in FIGS. 12 to 14, when the concave section 39 is formed at the attachment body 11, the entire weight of the non-pneumatic tire 1 can be reduced.

In addition, when burrs do not occur on the inner circumferential surface of the inner tubular body 12 upon welding of the split ring members 23 and 24 or when the burrs can be accommodated by the cross section concave V-shaped tapered portion 30, the groove 37 may not be formed in the attachment body 11.

Further, the components described in the above-mentioned embodiment and variant (provision or the like) of the present invention may be appropriately combined. In addition, the above-mentioned components may also be substituted with known components without departing from the spirit of the present invention.

INDUSTRIAL APPLICABILITY

According to the present invention, it is possible to provide the non-pneumatic tire capable of preventing positional deviation in the tire width direction of the inner tubular body and the attachment body.

DESCRIPTION OF REFERENCE SIGNS

1 Non-pneumatic tire
11 Attachment body
12 inner tubular body

13 Outer tubular body
15 Connecting member
18b, 18e Split surface
25, 26 Split body
27 Attachment concave section
28 Attachment convex section
29 Bolt (fastening member)
30 Cross section concave V-shaped tapered portion (outer circumferential section of attachment body)
38 Cross section convex V-shaped tapered portion (inner circumferential section of inner tubular body)
H Tire width direction

What is claimed is:

1. A non-pneumatic tire comprising:
an attachment body attached to an axle;
an inner tubular body fitted onto the attachment body from the outside;
an outer tubular body configured to surround the inner tubular body from the outside in a tire radial direction; and
a plurality of connecting members disposed between the inner tubular body and the outer tubular body in a tire circumferential direction and configured to connect both of the tubular bodies while maintaining relative elastic displacement therebetween,
wherein at least one of an outer circumferential section of the attachment body and an inner circumferential section of the inner tubular body that are locked to each other is inclined throughout the circumference in the tire circumferential direction from the outside toward the inside in the tire radial direction as it goes from both of the outsides toward the inside in a tire width direction, and formed in a V shape when seen in a cross-sectional view in the tire width direction.

2. The non-pneumatic tire according to claim 1, wherein the attachment body comprises a pair of split bodies that are split in the tire width direction.

3. The non-pneumatic tire according to claim 2, wherein an attachment concave section is formed in one of split surfaces of the pair of split bodies, and an attachment convex section locked to the attachment concave section is formed in the second split surface.

4. The non-pneumatic tire according to claim 2, wherein the pair of split bodies are fixed to each other by a fastening member.

5. The non-pneumatic tire according to claim 1, wherein the outer circumferential surface of the attachment body is the outer circumferential section throughout the region in the tire width direction, and inclined from the outside toward the inside in the tire radial direction as it goes from both of the outer ends in the tire width direction inward in the tire width direction.

* * * * *